Dec. 7, 1965 V. W. FARRIS 3,221,765
SAFETY VALVE
Filed Feb. 16, 1965 4 Sheets-Sheet 4
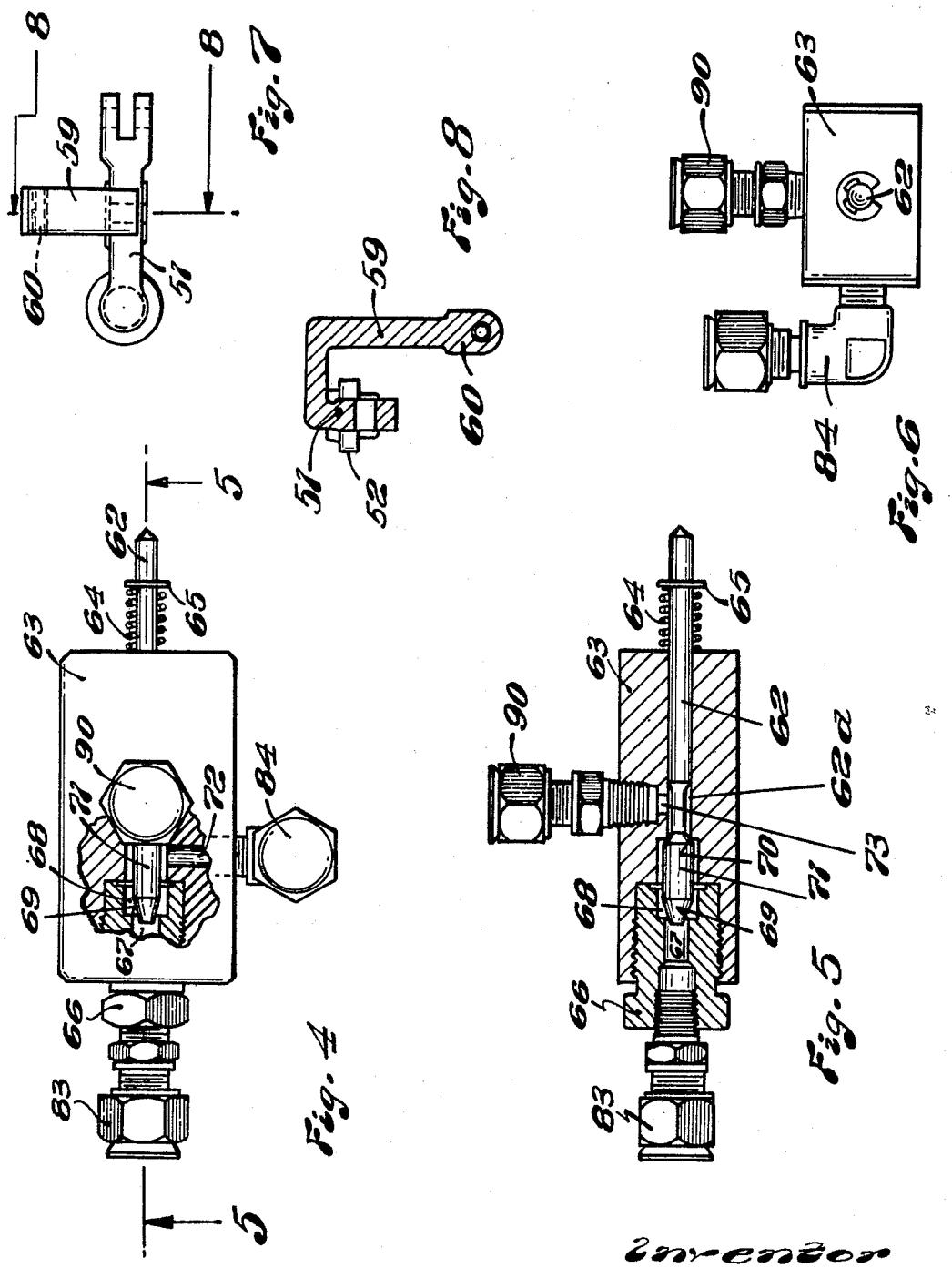
Inventor
Victor W. Farris
By Bernard H. Lemlein United States Patent Office 3,221,765
Patented Dec. 7, 1965

3,221,765
SAFETY VALVE
Victor W. Farris, 104 Woodland St., Englewood, N.J.
Substituted for abandoned application Ser. No. 275,161, Apr. 23, 1963. This application Feb. 16, 1965, Ser. No. 434,175
7 Claims. (Cl. 137—492)

This invention relates to safety valves, more particularly, to safety valves for relieving excessive pressure in fluid processing systems requiring continuous flow of the fluid being processed while maintaining the pressure exerted by the fluid within close limits.

This application is a continuation-in-part of my co-pending application, Serial No. 201,359, filed June 11, 1962, entitled "Safety Valve" and is filed as a substitute for my application, S.N. 275,161, filed April 23, 1963, entitled "Safety Valve."

It is the main object of the present invention to provide an improvement over the valve disclosed in my co-pending application by eliminating some of the mechanisms and their attendant functions originally thought to be necessary to accomplish the desired result.

It is a further object of the present invention to make the valve quicker acting in its response to increased pressure in the system being monitored.

It is a still further object of the present invention to provide closer control over the pressure at which relief takes place and at which the system returns to normal operation after the excess pressure condition has been remedied.

The foregoing objects are accomplished in the following manner:

A primary valve, which is directly exposed to and controls the discharge of the system fluid when the pressure in the main stream thereof becomes excessive, has a portion of such fluid diverted from the main stream. The diverted fluid is controlled by a secondary, multi-path-directing valve and applied directly above the primary valve normally to exert a force in opposition to the opening of the primary valve.

A pressure-sensing device is in open communication with the fluid the pressure of which it is desired to control, whereby slight increase in such pressure is immediately detected to initiate a rapidly occurring chain of events resulting in corrective action.

An adjustable pressure-setting mechanism has a linkage system operatively associated with it to apply a pre-determined blow-down pressure to the sensing device in opposition to the system pressure which, as stated, is in open communication with the sensing device.

Finally, a mechanism, operable under the control of the linkage system, acts upon the secondary valve to operate the same and provide a discharge path for the diverted fluid opposing the opening of the primary valve, whereby the latter can open in response to the excessive pressure in the main stream of the system fluid to relieve said excessive pressure.

In the following specifications there is described, and in the accompanying drawings shown, an illustrative embodiment of the safety valve of the present invention. It is, however, to be clearly understood that the present invention is not limited to such embodiment which is for illustrative purposes only. Changes may be made therein without departing from the spirit and scope of the present invention as set forth in the appended claims.

In said drawings:

FIG. 4 is a top plan view, partially broken away, of the secondary, multi-path-directing valve constituting part of the control mechanism shown best in FIGS. 2 and 3.

FIG. 5 is a longitudinal section taken along line 5—5 of FIG. 4.

FIG. 6 is an end view of the secondary valve shown in FIG. 4.

FIG. 7 is a top plan view of a bell-crank mechanism constituting part of the linkage system and secondary valve-operating mechanism, and FIG. 8 is a longitudinal section taken along line 8—8 of FIG. 7.

Figure 1:
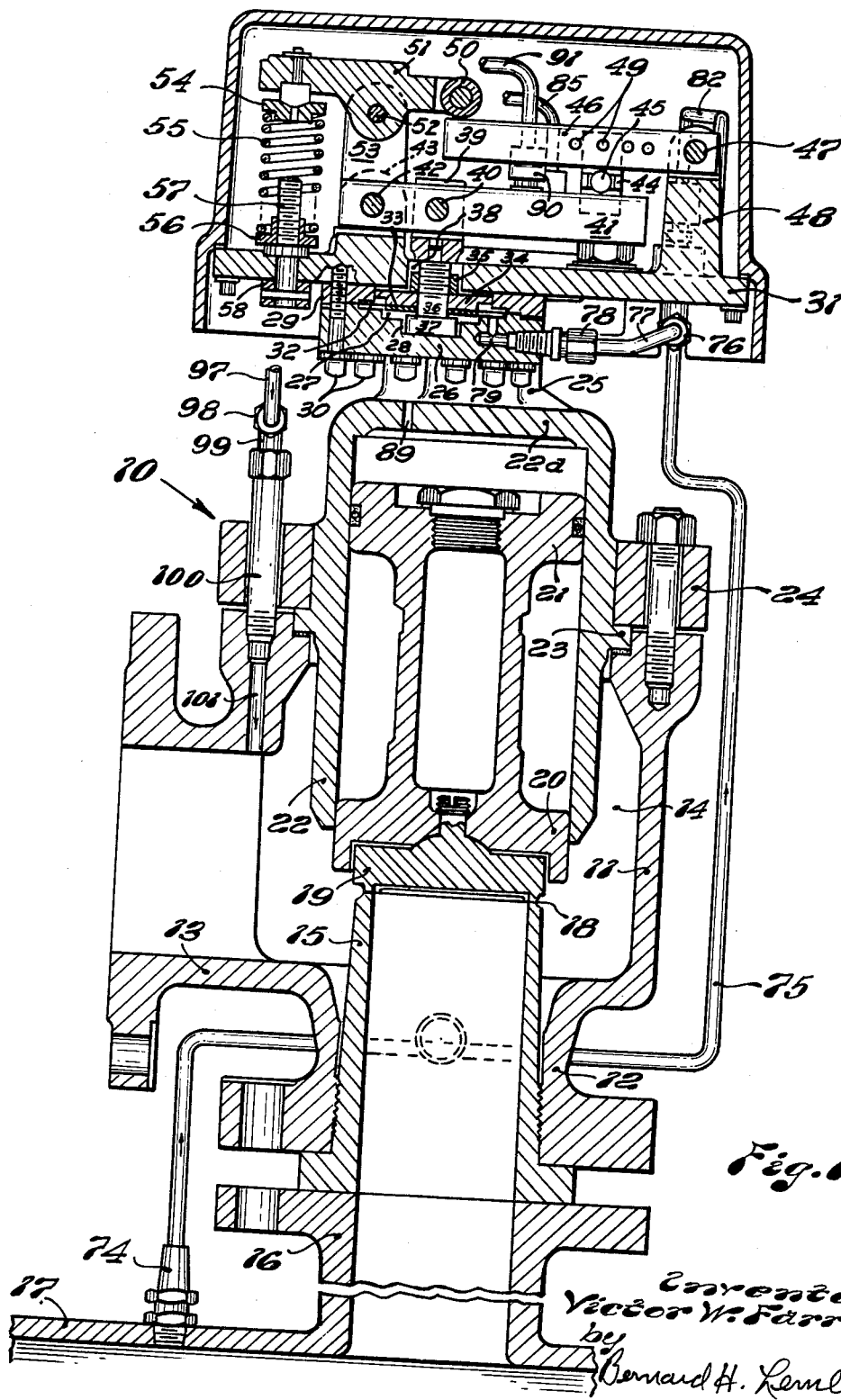
FIG. 1 is a longitudinal view of the safety valve of the present invention, partially in section and partially in elevation and taken substantially through the center of the device.
Figure 2:
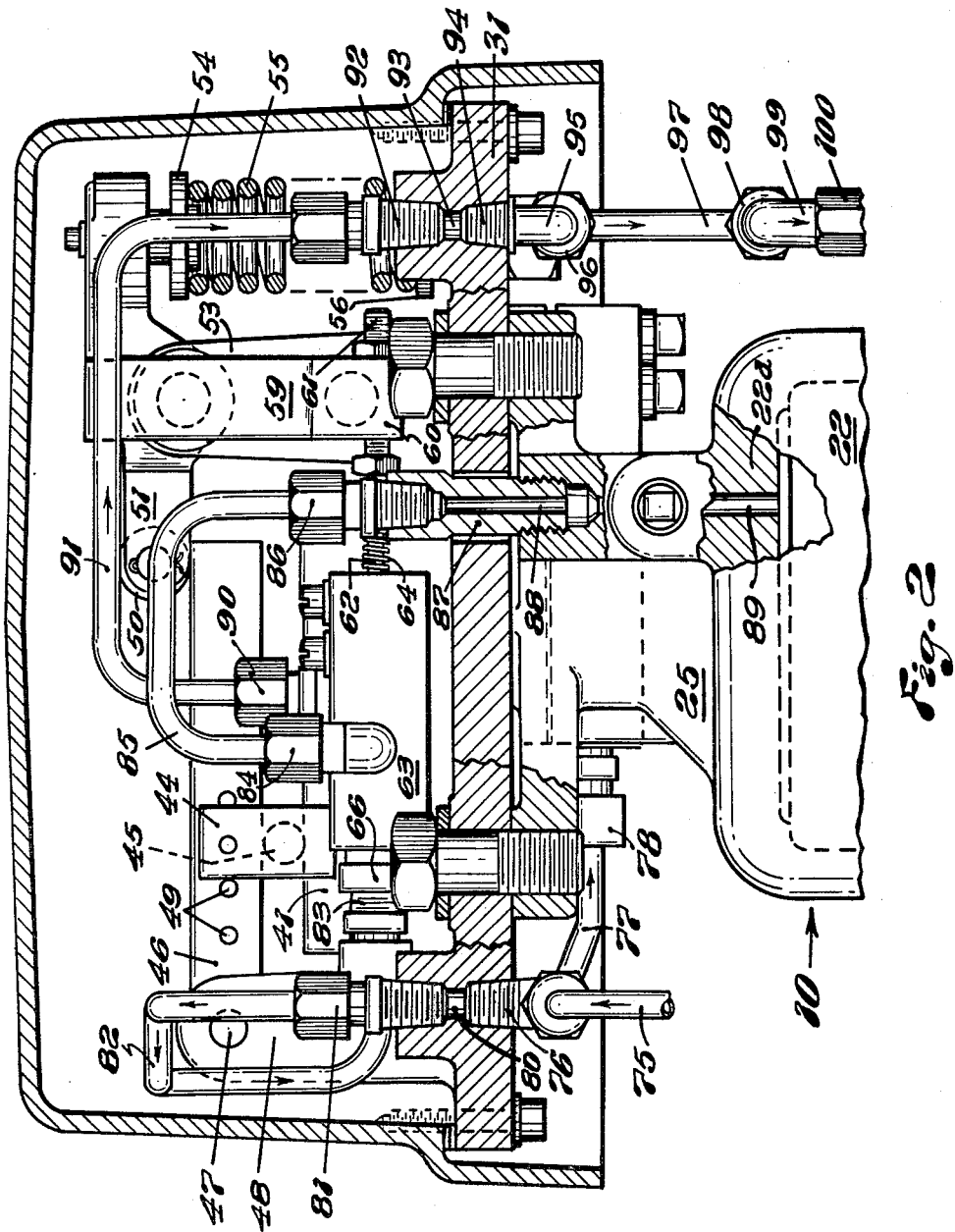
FIG. 2 is an enlarged, partial section, partial elevation of the control mechanism of the valve, looking from a direction opposite to that of FIG. 1.
Figure 3:
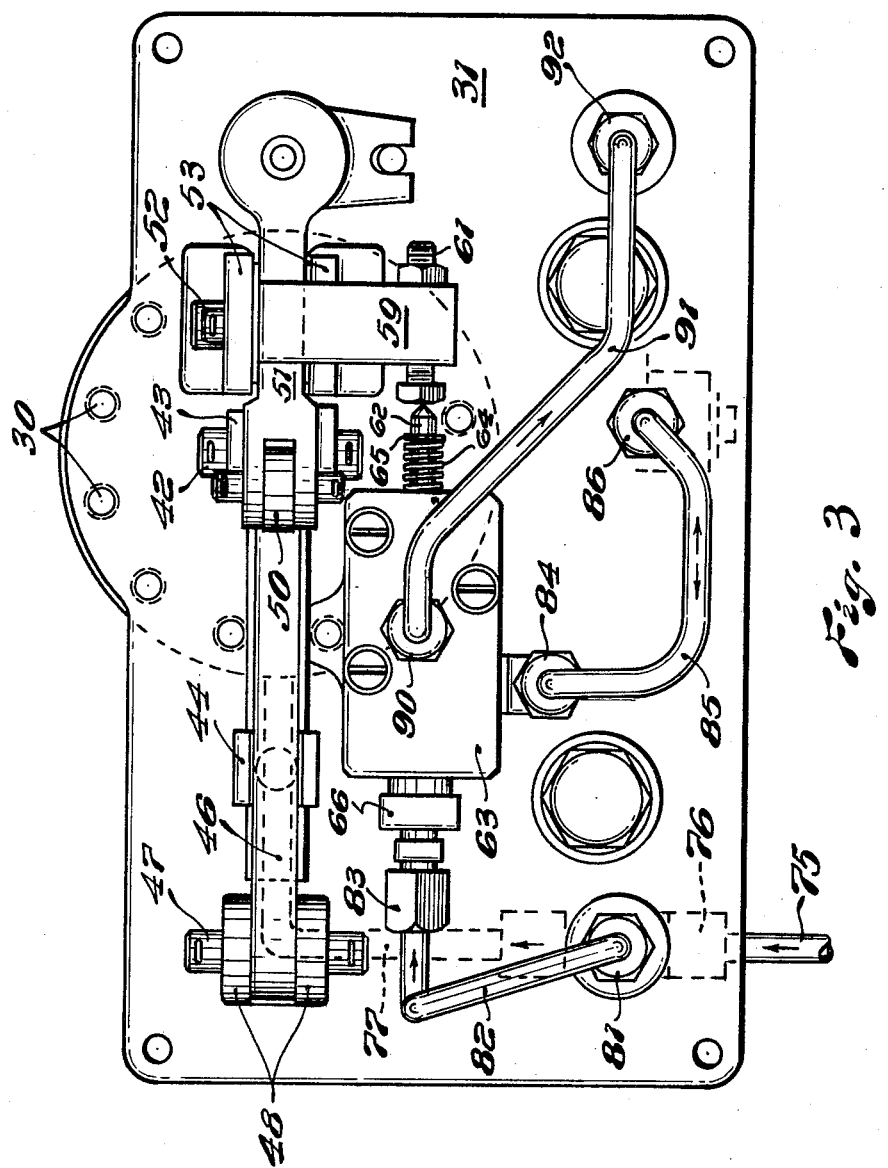
FIG. 3 is a top plan view of the control mechanism shown in FIG. 2.

Referring now more in detail to the aforesaid illustrative embodiment of the present invention, with particular reference to FIGS. 1-4, inclusive, of the drawings, the numeral 10 generally designates a safety valve which includes a primary valve body 11 provided with a flanged inlet 12 and a flanged outlet 13 in communication with each other through a primary body chamber 14.

The inlet 12 has secured therein a nozzle 15 of uniform internal diameter corresponding to the internal diameter of a flanged outlet 16 formed on a conduit 17 through which flows the fluid the pressure of which it is intended to control by the valve of the present invention.

A valve seat 18 is formed at the inner end of the nozzle 15 and a valve disk 19 cooperates with said seat to control communication between the inlet and the outlet of the primary valve body 11.

The valve disk 19 is carried in a disk holder 20, in turn, carried by a piston 21 which is slidably mounted in a cylinder 22, the latter having a dome 22a closing its upper end and being provided with a flange 23 by means of which it is secured on the upper end of the body 11 by a clamping ring 24.

Rising from the dome 22a of the cylinder 22 is a pedestal 25 carrying a circular plate 26, offset with respect to said pedestal, and provided in its upper surface with a depressed region 27 and a central well 28. The plate 26, together with a ring 29, is clamped by means of bolts 30 to the underside of a rectangular plate 31. A diaphragm 32 has its outer marginal region secured between the plate 26 and the ring 29, the inner marginal region of the diaphragm 32 being held between a disk 33 and piston 34. The disk 33 and piston 34 are fixed by a nut 35 on a threaded member 36 rising from a block 37 normally resting within the well 28, the nut 35 and the threaded member 36 extending into an aperture 38 in the plate 31.

The diaphragm 32, which constitutes the pressure-sensing device of the present invention, and the depressed region 27 and well 28 define a chamber adapted to directly receive, as will later be described, a portion of the fluid flowing through the conduit 17.

Carried by the threaded member 36 is a yoke 39 in which is fixed a pin 40. A lever 41 is rotatably mounted on the pin 40. One end of the lever 41 is rotatably mounted on another pin 42 carried in a pair of ears 43 rising from the plate 31. The other end of the lever 41 supports a carriage 44 in which is mounted a roller 45 permitting the carriage to ride along the length of the lever. Resting on the roller 45 is another lever 46 having one end thereof rotatably mounted on a pin 47 carried in another pair of ears 48 rising from the plate 31. The lever 46 is provided with a series of openings 49 in any one of which a pin may be selectively inserted to engage the carriage 44 and hold the same in a fixed position with respect to both levers 41 and 46.

The free end of the lever 46 engages another roller 50 carried by a third lever 51 which is rotatably mounted on a pin 52 secured in a pair of lugs 53 rising from the plate 31. The opposite end of the lever 51 engages a button 54 bearing against the upper end of a spring 55. The lower end of the spring 55 bears against another button 56 which is threadedly mounted on a lead screw 57, the latter being rotatably mounted in the plate 31 and having a knob 58 affixed to its outer end to enable rotation of the same and thereby adjust the force exerted by the spring 55 against the lever 51.

The lever 41, carriage 44 and lever 46 constitute a linkage system between the sensing diaphragm 32 and the lever 51 whereby the speed and magnitude of any movement of the diaphragm 32 is adjustably amplified at the lever 51.

As best seen in FIGS. 2, 3, 7 and 8, there is integrally formed with the lever 51 a bell-crank portion 59 at the lower, free end of which there is a socket 60 in which is threadedly engaged a screw 61. The screw 61 has bearing against it a rod 62 which is slidably mounted in a port 62a formed in a block 63 fixed upon the plate 31, the contact between the rod 62 and the screw 61 being maintained by a spring 64 coiled about the rod and having one end bearing against the block 63 and its other end bearing against a collar 65 fixed on the rod.

The end of the block 63 opposite the rod 62 is receptive of a plug 66 having a passage 67 therethrough communicating with a chamber 68. The chamber 68 is formed by cooperating facing recesses in the plug 66 and the block 63, the chamber 68 having valve seats 69 and 70 at opposite ends thereof and being receptive of a fluid path-directing valve 71.

The valve 71 is carried at the reduced inner end of the rod 62 and controls communication, via the chamber 68, on the one hand, between the passage 67 in the plug 66 and a port 72 extending through the block 63 at right angles to the chamber 68, and on the other hand, between the port 72 and port 62a. The port 62a, in turn, communicates with another port 73 formed in the block 63 and extending at right angles to the port 62a.

As stated in earlier portions of this specification, the pressure-sensing diaphragm 32 is in open communication with the system fluid flowing through the conduit 17. This communication is attained by coupling, as at 74, a pipe 75 to the conduit 17, the other end of the pipe 75 being connected, through a T-coupling 76, to another pipe 77. The latter is connected, through a coupling 78, with a right-angled port 79 formed in the plate 26 and communicating with the chamber beneath the diaphragm 32.

The T-coupling 76 is also connected to a port 80 formed in the plate 31 and this port is, in turn, connected to a coupling 81 at one end of a pipe 82. The pipe 82 communicates at its other end, through a coupling 83, with the passage 67 leading to the valve chamber 68 in the block 63.

The chamber 68 is connected, through a port 72, to a coupling 84 which, in turn, is connected to a pipe 85 at the other end of which there is a coupling 86 connected to a fitting 87 provided with a port 88. The fitting 87 passes through the plate 31 and is engaged in the pedestal 25 rising from the dome 22a of the cylinder 22. Communicating with the port 88 and passing through the pedestal 25 is a port 89 leading, through the dome 22a, to the interior of the cylinder 22 above the piston 21.

The chamber 68 is also connected, through the ports 62a and 73, to a coupling 90 at one end of a pipe 91, the latter having a coupling 92 at its other end connecting to a port 93 in the plate 31. The port 93 leads to a coupling 94, in turn, connected to a pipe 95. The other end of the pipe 95 is connected, through a coupling 96, to another pipe 97 and this pipe is connected, through another coupling 98, to still another pipe 99. The latter is connected to a fitting 100 which passes through the clamping ring 24 and is anchored in the outlet 13 of the primary valve body 11. The fitting 100 also communicates with a port 101 formed in and emptying into the discharge outlet 13.

This completes the description of the aforesaid illustrative embodiment of the present invention and its operation will now be described:

A portion of the fluid flowing through the conduit 17 is diverted from the conduit and passes through the pipe 75, T-coupling 76, pipe 77 and port 79 into the chamber defined by the depressed region 27 and well 28 of the plate 26, and diaphragm 32. Thus, the pressure exerted against the underside of the diaphragm 32 is equal to that of the main stream flowing through the conduit 17.

Opposed to this pressure is the force exerted by the spring 55. This force, which is adjustable by rotation of the knob 58 to set the pressure at which relief is to take place, is transmitted from the spring 55 to the diaphragm 32, through the linkage system, which includes the lever 51, roller 50, lever 46, carriage 44, roller 45, lever 41, yoke 39 and threaded member 36. The piston 34 is provided as a safety measure which takes over temporarily for the diaphragm 32 in the event the diaphragm should rupture. This precautionary measure prevents the escape of the fluid normally confined beneath the diaphragm.

A portion of the diverted fluid flowing through the T-coupling 76 flows from such coupling, through the port 80, pipe 82, and passage 67 into the chamber 68.

At this time, the valve 71 is, of course, held away from the seat 69 and closed against the seat 70 by the spring 64. Hence, fluid from the chamber 68 flows through the port 72, pipe 85, and ports 88 and 89 into the cylinder 22 above the piston 21. The pressure of this fluid, which is equal to the pressure in the conduit 17, is transmitted to the main valve disk 19 to hold the same closed against the seat 18, thereby preventing, at this time, discharge from the nozzle 15 to the outlet 13.

As soon as the pressure in the main stream flowing through the conduit 17 exceeds the pressure set by adjustment of the spring 55, the excess pressure is detected by the sensing diaphragm 32. The latter is flexed upwardly and this movement is transmitted, in opposition to the force of the spring 55, through the linkage system previously described, to the bellcrank portion 59 of the lever 51. As the lever 51 is rocked on the pin 52, the screw 61, carried at the lower end of the bellcrank, slides the rod 62 against the opposition of the spring 64, to move the valve 71 away from the seat 70 and against the seat 69.

This position of the valve 71 prevents further fluid from the conduit 17 from entering the chamber 68. It also permits the fluid trapped in the cylinder 22 above the piston 21 to find its way back to the chamber 68 from whence it flows, through the port 73, pipe 91, port 93, pipes 95, 97 and 99, fitting 100 and port 101, into the discharge outlet 13.

Inasmuch as the main valve disk 19 no longer has pressure exerted against it in opposition to the pressure of the fluid flowing through the conduit 17, the latter pressure causes the valve to open and permit discharge of the conduit fluid through the nozzle 15, valve body chamber 14 and outlet 13.

This discharge drops the pressure in the entire system, including the pressure exerted against the diaphragm 32. As a result, the force of the spring 55 is able, through the linkage system, to return the diaphragm 32 to its normal unflexed condition. At the same time, the rocking of the lever 51 toward its initial position permits the spring 64 to return the valve 71 to its original position. This, in turn, restores the flow of fluid from the chamber 68 to above the piston 21, which closes the main valve disk 19. At this time, the system is in the same condition as it was at the outset of this description of operation.

It is to be particularly noted that the speed of response of the device depends upon the position of the carriage 44 with respect to the pins 42 and 47. For a given upward movement of the diaphragm 32 in response to increased pressure in the conduit 17, the closer the carriage 44 is to the pin 42, or the further away from the pin 47, the smaller will be the amplitude of the movement of the lever 51 and the valve 71. Hence, the opening of the main valve disk 19 will be relatively slow and the same will be true of the relieving of the system of excessive pressure.

However, if the carriage 44 is set at a greater distance from the pin 42, or closer to the pin 47, a very small movement of the diaphragm 32 will bring about a rapid discharge of excessive system pressure.

This completes the description of the operation of the safety valve of the present invention. It will be noted from all of the foregoing that there has been provided a relatively simple device which is quick acting and accurate in its control of the pressure at which relief and return to normal can take place in a continuous fluid processing system.

What is claimed is:

1. Means for controlling the pressure of fluid flowing through a conduit comprising: a valve body having inlet and outlet ports, and a main valve controlling communication therebetween; said main valve being exposed to the fluid flowing through said conduit whereby a first pressure is exerted thereagainst, in a direction tending to open the same; a first means, including a fluid path-directing valve, for diverting a portion of the fluid flowing through said conduit and applying the same against said main valve to exert a second pressure thereagainst, in a direction tending to close the same; a diaphragm; upper and lower plates cooperating with each other to support the outer marginal region of said diaphragm therebetween; one of said plates being recessed to provide a cylinder; a piston slidable in said cylinder; a disc; said piston and said disc cooperating with each other to support the inner marginal region of said diaphragm therebetween; a second means, receptive of a portion of the fluid diverted by said first means, for applying the same, through a passage in the other of said plates, against said diaphragm to exert a first pressure thereagainst, normally in balance with the first and second pressures exerted against said main valve; a third means, including a linkage system, for applying, through said piston and said disc, a second pressure against said diaphragm in opposition to said first pressure applied thereagainst and equal to the pressure at which it is desired to open said main valve; and a fourth means, interposed between said fluid path-directing valve and said linkage system, and operable upon said first pressure exerted against said diaphragm exceeding said second pressure exerted thereagainst, for causing said fluid path-directing valve to discontinue the application of said second pressure against said main valve and permit the fluid previously applied thereagainst to flow to the outlet port of said valve body.

2. Means for controlling the pressure of fluid flowing through a conduit comprising: a valve body having inlet and outlet ports, and a main valve controlling communication therebetween; said main valve being exposed to the fluid flowing through said conduit whereby a first pressure is exerted thereagainst, in a direction tending to open the same; a first means, including a fluid path-directing valve, for diverting a portion of the fluid flowing through said conduit and applying the same against said main valve to exert a second pressure thereagainst, in a direction tending to close the same; a pressure-sensitive device; a second means, receptive of a portion of the fluid diverted by said first means, for applying the same against said pressure-sensitive device to exert a first pressure thereagainst, normally in balance with the first and second pressures exerted against said main valve; a first lever rotatably mounted at one end and pivotally connected at a fixed point along its length to said pressure-sensitive device; a second lever rotatably mounted at one end and carrying a roller adjustable along its length engaging the free end of said first lever at a selected distance from said fixed point of connection to said pressure-sensitive device; a third lever rotatably mounted along its length and carrying a roller at one end engaging the free end of said second lever; a third means loading the other end of said third lever whereby a second pressure is applied, through said first, second and third levers, against said pressure-sensitive device in opposition to said first pressure applied thereagainst and equal to the pressure at which it is desired to open said main valve; and a fourth means, interposed between said fluid path-directing valve and said third lever, and operable upon said first pressure exerted against said pressure-sensitive device exceeding said second pressure exerted thereagainst, for causing said fluid path-directing valve to discontinue the application of said second pressure against said main valve and permit the fluid previously applied thereagainst to flow to the outlet port of said valve body.

3. Means for controlling the pressure of fluid flowing through a conduit comprising: a first valve body having inlet and outlet ports, and a main valve controlling communication therebetween; said main valve being exposed to the fluid flowing through said conduit whereby a first pressure is exerted thereagainst, in a direction tending to open the same; a second valve body having first, second and third ports and a dual, secondary valve cooperable with seats formed with said first and third ports for simultaneously and oppositely controlling communication between said first and second ports and between said second and third ports; said first port communicating with said conduit and said second port communicating with said main valve, whereby when said secondary valve is opened away from the seat of said first port a portion of the fluid flowing through said conduit is diverted therefrom and applied against said main valve to exert a second pressure thereagainst, in a direction tending to close the same; said third port communicating with the outlet port of said first valve body; a pressure-sensitive device; a first means, receptive of another diverted portion of the fluid flowing through said conduit, for applying the same against said pressure-sensitive device to exert a first pressure thereagainst, normally in balance with the first and second pressures exerted against said main valve; a second means, including a linkage system, for applying a second pressure against said pressure-sensitive device in opposition to said first pressure applied thereagainst and equal to the pressure at which it is desired to open said main valve; a slidably mounted rod extending from said secondary valve; and a bell-crank lever extending from said linkage system and interposed between said rod and said linkage system, and operable upon said first pressure exerted against said pressure-sensitive device exceeding said second pressure exerted thereagainst, for closing said secondary valve against the seat of said first port to discontinue the application of said second pressure against said main valve and for simultaneously opening said secondary valve from the seat of said third port to permit the fluid previously applied against said main valve to flow to the outlet port of said first valve body.

4. Means for controlling the pressure of fluid flowing through a conduit comprising: a first valve body having inlet and outlet ports, and a main valve controlling communication therebetween; said main valve being exposed to the fluid flowing through said conduit whereby a first pressure is exerted thereagainst in a direction tending to open the same; a second valve body having first, second and third ports and a dual, secondary valve cooperable with seats formed with said first and third ports for simultaneously and oppositely controlling communication between said first and second ports and between second and third ports; said first port communicating with said conduit and said second port communicating with said main valve, whereby when said secondary valve is opened away from the seat of said first port a portion of the fluid flowing through said conduit is diverted therefrom and applied against said main valve to exert a second pressure thereagainst, in a direction tending to close the same; said third port communicating with the outlet port of said first valve body; a diaphragm; upper and lower plates cooperating with each other to support the outer marginal region of said diaphragm therebetween; one of said plates being recessed to provide a cylinder; a piston slidable in said cylinder; a disc; said piston and said disc cooperating with each other to support the inner marginal region of said diaphragm therebetween; a first means, receptive of another diverted portion of the fluid flowing through said conduit, for applying the same, through a passage in the other of said plates, against said diaphragm to exert a first pressure thereagainst, normally in balance with the first and second pressures exerted against said main valve; a second means, including a linkage system, for applying, through said piston and said disc, a second pressure against said diaphragm in opposition to said first pressure applied thereagainst and equal to the pressure at which it is desired to open said main valve; and a third means, interposed between said secondary valve and said linkage system, and operable upon said first pressure exerted against said diaphragm, exceeding said second pressure exerted thereagainst, for closing said secondary valve against the seat of said first port to discontinue the application of said second pressure against said main valve and for simultaneously opening said secondary valve from the seat of said third port to permit the fluid previously applied against said man valve to flow to the outlet port of said first valve body.

5. Means for controlling the pressure of fluid flowing through a conduit comprising: a first valve body having inlet and outlet ports, and a main valve controlling communication therebetween; said main valve being exposed to the fluid flowing through said conduit whereby a first pressure is exerted thereagainst in a direction tending to open the same; a second valve body having first, second and third ports and a dual, secondary valve cooperable with seats formed with said first and third ports for simultaneously and oppositely controlling communication between said first and second ports and between said second and third ports; said first port communicating with said conduit and said second port communicating with said main valve, whereby when said secondary valve is opened away from the seat of said first port a valve is opened away from the seat of said first port a portion of the fluid flowing through said conduit is diverted therefrom and applied against said main valve to exert a second pressure thereagainst, in a direction tending to close the same; said third port communicating with the outlet port of said first valve body; a diaphragm; upper and lower plates cooperating with each other to support the outer marginal region of said diaphragm therebetween; a piston slidable in a recess in one of said plates and engaging the inner marginal region of said diaphragm; a first means, receptive of another diverted portion of the fluid flowing through said conduit, for applying the same, through a passage in the other of said plates, against said diaphragm to exert a first pressure thereagainst, normally in balance with the first and second pressures exerted against said main valve; a first lever rotatably mounted at one end and pivotally connected at a fixed point along its length to said diaphragm; a second lever rotatably mounted at one end and carrying a roller adjustable along its length engaging the free end of said first lever at a selected distance from said fixed point of connection to said diaphragm; a third lever rotatably mounted along its length and carrying a roller at one end engaging the free end of said second lever; a second means loading the other end of said third lever whereby a second pressure is applied, through said first, second and third levers, against said diaphragm in opposition to said first pressure applied thereagainst and equal to the pressure at which it is desired to open said main valve; and a third means, interposed between said secondary valve and said third lever, and operable upon said first pressure exerted against said diaphragm, exceeding said second pressure exerted thereagainst, for closing said secondary valve against the seat of said first port to discontinue the application of said second pressure against said main valve and for simultaneously opening said secondary valve from the seat of said third port to permit the fluid previously applied against said main valve to flow to the outlet port of said first valve body.

6. Means for controlling the pressure of fluid flowing through a conduit comprising: a first vavle body having inlet and outlet ports, and a main valve controlling communication therebetween; said main valve being exposed to the fluid flowing through said conduit whereby a first pressure is exerted thereagainst, in a direction tending to open the same; a dual, secondary valve communicating with said conduit and said valve whereby when said secondary valve is in one of its positions, a portion of the fluid flowing through said conduit is diverted therefrom and applied against said main valve to exert a second pressure thereagainst, in a direction tending to close the same; a pressure-sensitive device; a first means, receptive of another diverted portion of the fluid flowing through said conduit, for applying the same against said pressure-sensitive device to exert a first pressure thereagainst, normally in balance with the first and second pressures exerted against said main valve; a second means, including a linkage system, for applying a second pressure against said pressure-sensitive device in opposition to said first pressure applied thereagainst and equal to the pressure at which it is desired to open said main valve; a slidably mounted rod extending from said secondary valve; and a bell-crank lever extending from said linkage system and interposed between said rod and said linkage system, and operable upon said first pressure exerted against said pressure-sensitive device exceeding said second pressure exerted thereagainst, for moving said secondary valve into its other position to discontinue the application of said second pressure against said main valve and to permit the fluid previously applied against said main valve to flow to the outlet port of said first valve body.

7. Means for controlling the pressure of fluid flowing through a conduit comprising: a first valve body having inlet and outlet ports, and a main valve controlling communication therebetween; said main valve being exposed to the fluid flowing through said conduit whereby a first pressure is exerted thereagainst in a direction tending to open the same; a dual secondary valve communicating with said conduit and said main valve, whereby when said secondary valve is in one of its positions, a portion of the fluid flowing through said conduit is diverted therefrom and applied against said main valve to exert a second pressure thereagainst, in a direction tending to close the same; a diaphragm; upper and lower plates cooperating with each other to support the outer marginal region of said diaphragm therebetween; one of said plates being recessed to provide a cylinder; a piston slidable in said cylinder; a disc; said piston and said disc cooperating with each other to support the inner marginal region of said diaphragm therebetween; a first means, receptive of another diverted portion of the fluid flowing through said conduit, for applying the same, through a passage in the other of said plates, against said diaphragm to exert a first pressure thereagainst, normally in balance with the first and second pressures exerted against said main valve; a second means, including a linkage system, for applying, through said piston and said disc, a second pressure against said diaphragm in opposition to said first pressure applied thereagainst and equal to the pressure at which it is desired to open said main valve; and a third means, interposed between said secondary valve and said linkage system, and operable upon said first pressure exerted against said diaphragm exceeding said second pressure exerted thereagainst, for moving said secondary valve into its other position to discontinue the application of said second pressure against said main valve and to permit the fluid previously applied against said main valve to flow to the outlet port of said first valve body.

References Cited by the Examiner
UNITED STATES PATENTS

| | | | |
|---|---|---|---|
| 549,407 | 11/1895 | Vail | 92—97 XR |
| 868,030 | 10/1907 | Tanner et al. | 137—492 |
| 2,377,227 | 5/1945 | Griswold | 137—492 XR |
| 2,643,676 | 6/1953 | Curran | 137—492 |
| 2,917,268 | 12/1959 | Soderberg et al. | 251—234 XR |

M. CARY NELSON, *Primary Examiner.*